July 11, 1933.                H. G. GILLILAND                1,917,516
                          TREATMENT OF SEWAGE SLUDGES
                              Filed July 28, 1930
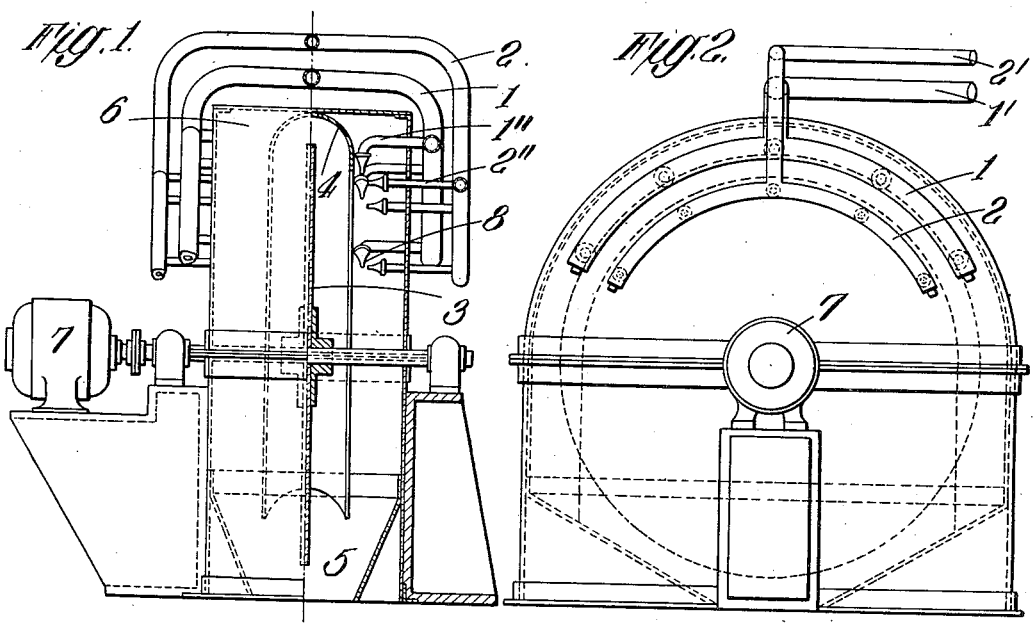
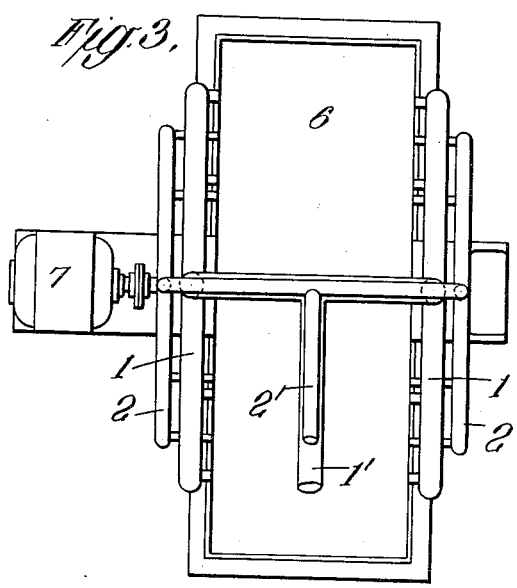
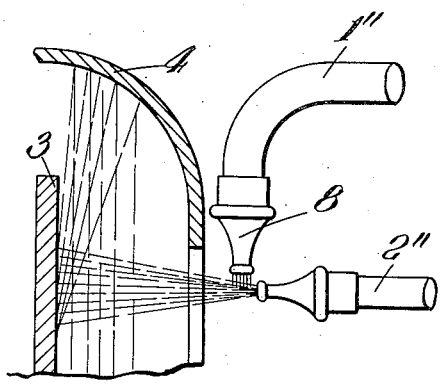
Inventor
Horace G. Gilliland Patented July 11, 1933

1,917,516

UNITED STATES PATENT OFFICE

HORACE GRAY GILLILAND, OF NEAR CHESHUNT, ENGLAND

TREATMENT OF SEWAGE SLUDGES

Application filed July 28, 1930, Serial No. 471,426, and in Great Britain September 17, 1929.

This invention relates to the treatment of sewage sludges for the recovery of the organic matter therefrom.

For the separation of the organic matter from sewage sludge in order to render it serviceable for fertilizing and other purposes it has been proposed to run the sludge into a tank and to add yeast thereto, a suitable proportion being about 10 cwts. yeast to 100 tons sewage. As a result of the fermentation set up by the yeast the organic portion is forced up to the top of the liquor from which it can be removed and thereafter utilized. In this process of separating the organic matter from the sewage sludge by the action of yeast, the organic matter in the form of a sludge, which remains after the more or less clear liquor and sand in the lower half of the tank have been run off, still contains a large quantity of water, usually about five parts by weight of water to one part by weight of solid materials; the nature of the sludge of organic matter does not permit of the removal of the water therefrom by filtration, and its removal by evaporation would necessitate the use of such a large quantity of fuel as to be commercially impracticable. The present invention has for its object the treatment of the sludge of organic matter (obtained from sewage sludge by the action of yeast above referred to) so as to render a large proportion of the water contained therein removable by filtration and to obtain ultimately a product which can be dried with a reasonable expenditure of fuel. For this purpose, according to the present invention, there is first added to the sludge of organic matter obtained by the action of yeast on sewage sludge an acid in order to arrest the fermentation, then after an interval of a few minutes calcium oxide or hydroxide, and thereafer a powdered solid carbonaceous material such as powdered coke or coze breeze, the mixture of sludge and the various materials added thereto being then subjected to violent agitation while in a hot condition, preferably at a temperature of about 80° F. to 200° F., whereupon the agitated mixture is filtered while still hot. The mixture is brought to the required high temperature by heating the sludge prior to or after the various ingredients above mentioned have been added thereto. By means of the treatment according to the present invention, a large quantity of water can be removed from the mixture by filtration and a residue obtained containing from about 25 to 50 per cent of water according to the proportions of the various substances added to the sludge of organic matter obtained by the action of yeast on sewage sludge and the conditions under which the treatment is carried out.

The sewage sludge which is first subjected to fermentation with yeast in the known manner as above referred to is preferably the sludge obtained in the treatment of sewage by the "activation" or "precipitation" process, that is, it consists of a sludge which is more concentrated than the original sewage from which latter it is obtained by treatment with suitable micro-organisms or chemical precipitants, such for example as lime or alumino-ferric.

An example of the treatment of a sludge of organic matter obtained from the sewage sludge by the process according to the present invention is as follows:

To about 100 parts by weight of the sludge of organic matter obtained by the action of the yeast on the sewage sludge aforementioned, there is added 5 parts by weight of sulphuric acid, then after a short interval of time, 5 parts by weight of lime, CaO, and then ofter another short interval of time about 8 parts by weight of coke breeze, ground up so as to pass a sieve of about 10 to 60 mesh to the inch. Considerable variations, however, may be made in the proportions of acid, calcium oxide or hydroxide and carbonaceous material to be added to the sludge of organic matter; for example to 100 parts of the said sludge, there may be added 1 to 5 parts of an acid such for example as sulphuric acid, 2 to 8 parts of calcium oxide or calcium hydroxide, and 2 to 10 parts of powdered coke or other solid carbonaceous material. The sludge of organic matter is heated, prior to or after the various ingredients have been added thereto, to a temperature of about 80° to 200° F., and the hot mixture is then subjected to violent agitation for example by blowing the mixture, on its discharge from the receptacle containing it, by means of an air blast at a pressure of about 50 to 100 lbs. per square inch against a plate arranged transversely to the stream of hot mixture; this has the effect of breaking down the skin or membrane surrounding the particles of organic matter which are mainly present in a colloidal condition in the sludge and thus rendering practicable the separation of the water therefrom.

An atomizing apparatus suitable for violently agitating the mixture as just described is illustrated in the accompanying drawing, in which:

Figure 1 is a part sectional elevation of the apparatus.

Figure 2 is an end elevation.

Figure 3 is a plan view, and

Figure 4 is an enlarged detail view of the mixture-blowing device.

Referring to the drawing, 6 indicates the steel casing of the atomizing apparatus. The hot mixture, obtained in the manner previously described, is discharged from the receptacle containing it (not shown in the drawing) through the pipe 1' into the main conduit 1 provided with a number of branch pipes 1''. On discharge from the nozzles 8 of the branch pipes 1'', the hot stream of material meets a stream of compressed air from the branch pipes 2'' fed from the main conduit 2 to which the compressed air is supplied through the pipe 2'. The air blast from the pipes 2'' blows the hot mixture against the revolving steel disc 3 driven by the electric motor 7. The material dropping down from the disc 3 and the surrounding baffle plate 4 against which it is projected from the disc falls into the chute 5, whence it passes to the filtering plant (not shown in the drawing). The mixture after it has been well agitated as just mentioned is filtered hot, preferably between about the range of temperatures above-mentioned, there being preferably used for this purpose either a vacuum filter or a plate-and-frame filter press. The mixture filters easily and the resultant cakes contain, as previously mentioned, a proportion of water which will vary from about 25 to 50 per cent of the total weight of the cake. The cakes are then air-dried by exposure to warm air at a temperature of about 60° to 70° F. for a few days, for example three days, until the water contained therein has been reduced by evaporation to about 15 to 40 per cent. Finally when necessary the cakes can be further dried by heating them to a higher temperature, if desired in a vacuum drier, until a product is obtained containing not more than about 15 per cent of water. The cakes which have been dried to the required extent are suitable for use as fertilizers, preferably after breaking them up or grinding them to a powder.

By means of the present invention sewage sludges of the kind previously mentioned can thus be treated simply and economically so as to obtain a product containing a high percentage of nitrogenous matter together with mineral constituents which render it of special value as a fertilizer.

What I do claim and desire to secure by Letters Patent of the United States is:—

1. A method of treating the sludge of organic matter obtained by the action of yeast on sewage sludges, which method consists in adding to the aforesaid sludge of organic matter a small quantity of sulphuric acid to arrest the fermentation in the sludge, mixing with the acidified sludge a sufficient quantity of a substance from the group consisting of calcium hydroxide and calcium oxide to neutralize the acid and then adding to the mixture a small quantity of powdered coke, then subjecting the mixture of sludge and the various materials added thereto to violent agitation while it is in a hot condition by blowing the said hot mixture with an air blast against a plate arranged transversely to a stream of the hot mixture, and thereafter subjecting the agitated mixture to filtration while at a temperature of about 80° to 200° F. and thereby removing therefrom a large proportion of the water contained in the sludge.

2. A method as in claim 1, in which the sludge of organic matter subjected to treatment is obtained by the action of yeast on "activated" sewage.

3. A method as in claim 1, in which the sludge of organic matter subjected to treatment is obtained by the action of yeast on "precipitated" sewage.

4. A method as in claim 1, in which the mixture of sludge and other materials subjected to the violent agitation is obtained by adding to about 100 parts by weight of the sludge of organic matter about five parts by weight of sulphuric acid, then adding five parts by weight of lime, and finally about eight parts by weight of powdered coke.

5. A method as in claim 1, in which the cakes obtained by filtration of the hot mixture are dried until their water content has been reduced to about fifteen to forty per cent.

6. A method as in claim 1, in which the cakes obtained by filtraton of the hot mixture are dried by exposure to warm air and then further dried by heating them to a higher temperature until a product is obtained of which the water content does not exceed about fifteen per cent.

HORACE GRAY GILLILAND.